Jan. 26, 1943.   H. L. HUNN ET AL   2,309,345
SAUSAGE STUFFERS
Filed Sept. 15, 1941
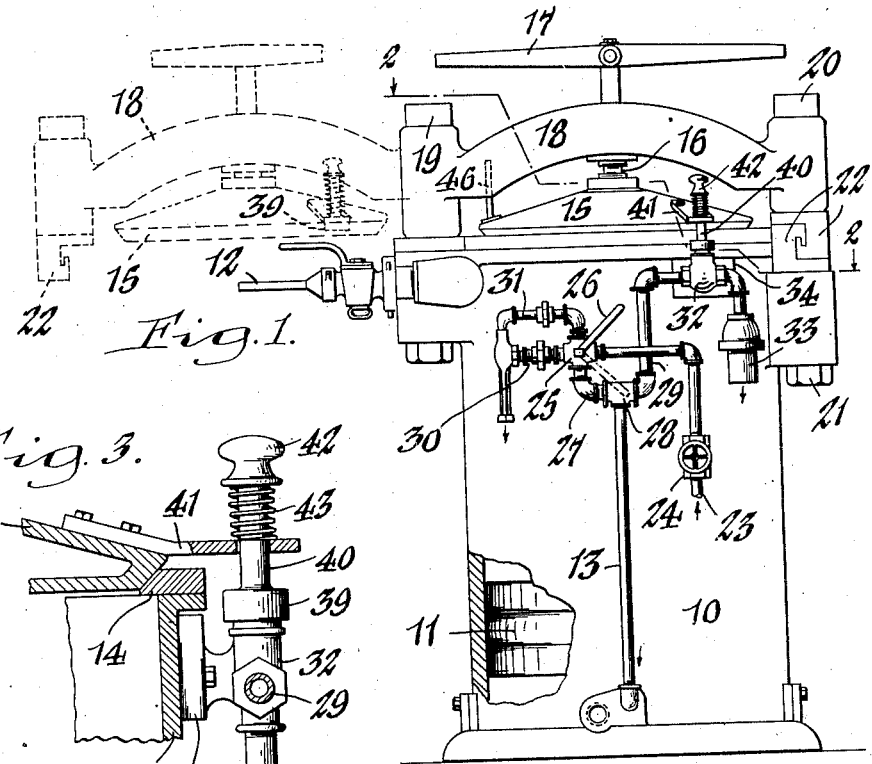
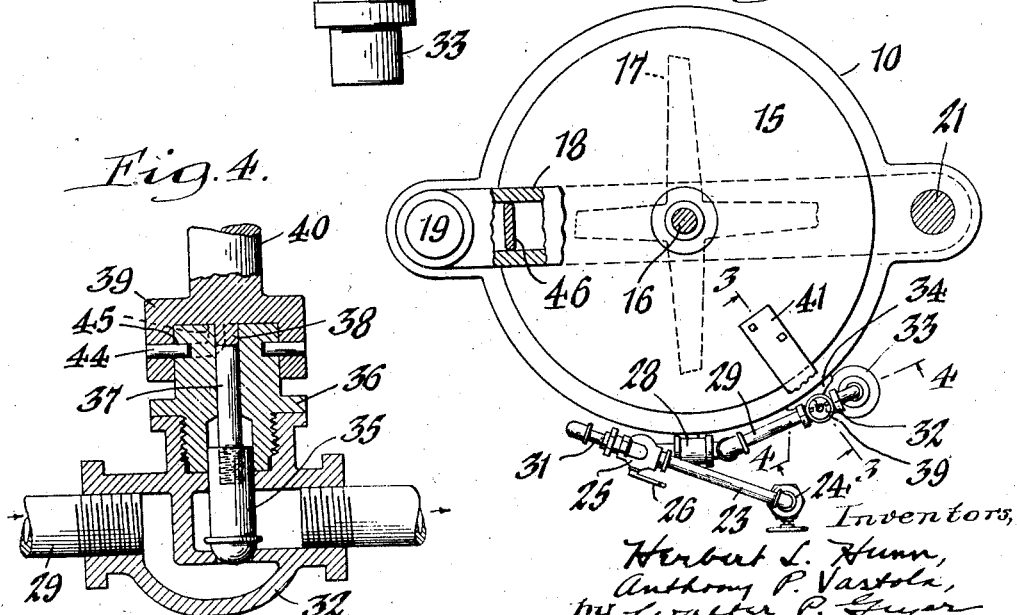
Inventors,
Herbert L. Hunn,
Anthony P. Vastola,
by Walter P. Guyer
Attorney.

Patented Jan. 26, 1943

2,309,345

UNITED STATES PATENT OFFICE 2,309,345

SAUSAGE STUFFER

Herbert L. Hunn and Anthony P. Vastola, Buffalo, N. Y., assignors to John E. Smith's Sons Company, Buffalo, N. Y., a corporation of New York Application September 15, 1941, Serial No. 410,846

5 Claims. (Cl. 17—39)

This invention relates generally to sausage stuffers but more particularly to a novel safety attachment therefor.

One of its objects is to provide a safety attachment for stuffers which is so designed as to normally and positively prevent the admission of air under high pressure to the stuffer to operate the piston unless the cover is closed and securely held down in place ready for stuffing purposes.

Another object of the invention is to provide a safety air control device, which, while simple, compact and inexpensive in construction, will prevent the building up of excessive pressure in the stuffer-cylinder below the piston and thereby afford maximum safety to the operators and eliminate danger of accidents due to excess air pressures.

A further object is to provide a safety attachment of this character which is so designed as to enable the piston to be raised slowly, as during a partial loading operation, while the cover is open.

A still further object is to provide a safety device which is capable of ready attachment to existing stuffers.

Other features of the invention reside in the construction and arrangement of parts hereinafter described, and particularly pointed out in the appended claims.

In the accompanying drawing:

Figure 1 is a front elevation, partly in section, of a sausage stuffer equipped with our safety attachment, the cover of the stuffer being closed and the parts being in their normal stuffing position. Figure 2 is a horizontal section taken in the plane of line 2—2, Figure 1. Figure 3 is an enlarged fragmentary cross section taken on line 3—3, Figure 2. Figure 4 is a vertical section taken on line 4—4, Figure 2.

Similar characters of reference indicate corresponding parts throughout the several views.

Referring now to the drawing, 10 indicates the upright cylinder of a stuffing apparatus for receiving meat dough or other plastic material, and 11 the piston operable therein for ejecting the meat dough therefrom through the customary valved spout or nozzle 12. The lower end of the cylinder is closed and leading thereto is a pipe 13 for admitting the motive fluid, such as air under pressure, to the cylinder for raising the piston to discharge its contents.

At its open upper or delivery end the cylinder is provided with a safety ring 14 which projects inwardly a suitable distance beyond the inner wall of the cylinder to form a stop or shoulder for the piston. A cover 15 is engageable with the opening in the safety ring to normally seal the open end of the cylinder and is attached to the lower end of a clamping screw 16 provided at its upper end with a handle 17 and carried by a horizontally-swinging yoke 18 fulcrumed at one side to a pivot bolt 19 and adapted to be detachably clamped at its opposite side by bolts 20, 21 for firmly holding it against lateral and vertical displacement. These clamping bolts terminate at their opposing ends in heads 22 which are substantially hook-shaped to slidably interlock with each other as the cover-yoke is swung to its operative position.

The safety device for preventing the admission of air under high pressure to the cylinder unless the cover 15 is closed is preferably constructed as follows:

Air under pressure for delivery to the cylinder 10 through the pipe 13 is obtained from a supply pipe 23 in which is interposed a main valve 24 and an auxiliary or control valve 25 having an operating handle or lever 26 thereon. This control valve is a 4-way type of valve of conventional construction having four ports in its casing and two ports in its valve plug, being connected by a branch fitting 27 to one end of a T-fitting 28 applied to the inlet end of the pipe 13, the other end of such T-fitting having a branch pipe 29 connected thereto which functions as a by-pass for the air under pressure when the cylinder-cover 15 is not properly closed. Also leading from the control valve 25 are exhaust fittings 30 and 31, the fitting 31 being connected at its outlet end to the corresponding end of the companion fitting 30. Thus, when the operating handle 26 of the valve 25 is in the full line position, shown in Figure 1, to raise the piston 11, air is delivered through said valve to the branch fitting 27 and thence to the pipe 13 leading to the bottom of the cylinder 10. When the valve-handle is in the dotted line position, shown in Figure 1 to lower the piston, the air pressure is cut off to the pipe 13 and the valve is set to exhaust the air in the cylinder through such pipe 13, branch fitting 27, valve 25, and exhaust fitting 30 to the atmosphere. During the raising of the piston the main valve 24 is open and during the lowering of the piston such valve is opened slightly as required to apply the vacuum to pull the piston down.

Interposed in the branch or by-pass pipe 29 is a check or safety valve 32 and beyond the latter is an exhaust fitting 33 which preferably open downwardly and over which the palm of the hand may be conveniently placed for a purpose which will hereinafter appear. This check valve is so disposed and correlated with the cover 15 that when the latter is in its tightly closed or sealed position, the valve may be closed so that the air under pressure will not by-pass through it but will be wholly admitted to the cylinder 10 to raise the piston 11. On the other hand, when the cover is open or swung to one side, the valve 32 is automatically opened and the air under pressure is by-passed through it, thereby preventing high air pressure being admitted beneath the piston and eliminating danger of accidents, such as the piston being blown out of the cylinder. This check valve is attached adjacent the upper end of the cylinder and beneath the safety ring 14 by a bracket 34. Fitted in this valve is an upwardly-opening valve-plug 35 guided on a sleeve 36 and having a stem 37 rising therefrom for depressing contact with a pin 38 projecting from the hollow end or collar 39 of an aligning actuating plunger 40 adapted for detachable coupling engagement with the valve and suspended from a bracket 41 applied to and extending radially from the cover. At its upper end this actuating plunger has a knob 42 and interposed between the latter and the bracket 41 is a spring 43 which tends normally to raise the plunger to bring its pin 38 out of abutting engagement with the valve-stem 37 and permit the valve-plug 35 to be opened upwardly by the air pressure admitted to the by-pass pipe 29. The valve-plug is detachably held down in its closed position by depressing the actuating plunger 40, the collar 39 thereof having coupling pins 44 projecting radially and inwardly thereof for releasable engagement with companion L-shaped notches 45 formed in the valve-guide 36, whereby, upon depressing and turning the actuating plunger a quarter of a turn, the valve-plug is lowered and closed against its seat and retained in such position until released by a reversal of these steps.

Rising from the cover 15 at one side thereof is a stop lug 46 which normally extends at its upper end into the channeled bottom side of the swinging cover-yoke 18 to prevent turning of the cover relative to the yoke and to insure alinement of the plunger 40 with the safety valve 32.

The operation of the stuffer and its safety device is as follows:

In the normal operation, the cylinder 10 is filled with the meat dough, the cover 15 is closed tightly, and the safety valve actuating plunger 40 is depressed and coupled with the valve-guide 36 to lower and retain the valve-plug 35 closed to prevent by-passing of the air through the safety valve 32. The handle 26 of the control valve 25 is then moved to the raised position shown by full lines in Figure 1 to admit air to the cylinder and the main air valve 24 is opened slowly to gradually build up sufficient stuffing pressure, whereupon the piston 11 is raised and the meat dough discharged through the spouts 12.

After the contents of the stuffer have been discharged and it is desired to lower the piston to re-charge the cylinder, the main air valve 24 is closed and the handle of the control valve 25 is moved to its lower position shown by dotted lines in Figure 1 to cut off the air to the cylinder and exhaust it from the same through the exhaust fitting 30. When the high pressure is exhausted from the cylinder, the safety valve actuating plunger 40 is disconnected from the valve 32 and elevated to its released position by the spring 43, after which the cover 15 is raised and swung to one side. The main valve 24 is now opened to create a vacuum in the cylinder through the communicating exhaust fittings 30, 31 and pipe 13 to effect the lowering of the piston. The piston may also be raised slowly and without danger when the cover is open, as when partially filling the stuffer-cylinder, by moving the handle of the control valve 25 to its raised position, slowly opening the main valve 24 and at the same time holding the palm of the hand over the by-pass exhaust fitting 33.

While manifestly simple, compact and inexpensive in construction and reliable in operation, this device affords maximum safety to the operators of stuffing apparatus and positively prevents the admission of excess air pressure under the discharging piston unless the cylinder-cover is securely closed.

We claim as our invention:

1. A stuffing apparatus, comprising a cylinder open at its upper end, a piston operable therein, a cover for the open end of the cylinder including means for actuating it to and from its closed position, means for introducing a fluid medium under pressure into said cylinder to raise the piston therein, a valve for controlling the flow of such medium into the cylinder, a by-pass connection interposed in said fluid-introducing means between its connection to the cylinder and said control valve, a valve in said by-pass connection for governing the exhausting of the fluid medium therethrough, and an actuating means for the by-pass-governing valve applied to the cover for closing the former when the latter is in its closed position, said last-named valve and its actuating means having complementary coupling elements thereon for detachably retaining such parts in valve-closing position.

2. A stuffing apparatus, comprising a cylinder open at its upper end, a piston operable therein, a cover for the open end of the cylinder including means for actuating it to and from its closed position, means for introducing a fluid medium under pressure into said cylinder to raise the piston therein, a valve for controlling the flow of such medium into the cylinder, a by-pass connection interposed in said fluid-introducing means between its connection to the cylinder and said control valve, a valve in said by-pass connection for governing the exhausting of the fluid medium therethrough, and an actuating means for the by-pass-governing valve applied to the cover for closing the former when the latter is in its closed position, said means including a depressible member engageable with the stem of the by-pass valve for moving it to a closed position, a spring applied to said depressible member for normally urging it to a valve-opening position, and complementary coupling elements applied to said by-pass valve and its actuating member for releasably retaining the latter in its valve-closing position.

3. A stuffing apparatus, comprising a cylinder open at its upper end, a piston operable therein, a cover for the open end of the cylinder including means for actuating it to and from its closed position, means for introducing a fluid medium under pressure into said cylinder to raise the piston therein, a valve for controlling the flow of such medium into the cylinder, a by-pass connection interposed in said fluid-introducing means between its connection to the cylinder and said control valve, a valve in said by-pass connection for governing the exhausting of the fluid medium therethrough, an actuating means for the by-pass-governing valve applied to the cover for closing the former when the latter is in its closed position, said last-named valve and its actuating means having complementary coupling elements thereon for detachably retaining such parts in valve-closing position, and a fitting applied to the exhaust end of said by-pass connection and over which the palm of the hand is adapted to be placed for governing at the will of the operator the exhausting of the fluid medium therethrough to regulate the raising of the piston in the cylinder.

4. A safety attachment for fluid-pressure-operated stuffing apparatus having a cover movable to an open and closed position, comprising an exhaust connection adapted to be interposed in the fluir pressure line of the apparatus and having a check valve therein, a bracket projecting radially from the cover and having a valve-actuating member suspended therefrom for cooperative relation with said valve in the closed position of the cover, and complementary coupling means applied to said actuating member and said valve for releasably retaining the latter in its closed position.

5. A safety attachment for fluid-pressure-operated stuffing apparatus having a cover movable to an open and closed position, comprising an exhaust connection adapted to be interposed in the fluid pressure line of the apparatus and having a check valve therein, including a stem rising therefrom, a bracket projecting radially from the cover and having a valve-actuating plunger suspended therefrom for movement relative thereto and for alining cooperative relation with said valve in the closed position of the cover, a spring applied to said plunger for normally urging it to valve-opening position, and coupling elements applied to said valve and its actuating plunger for releasably retaining the valve in its closed position.

HERBERT L. HUNN.
ANTHONY P. VASTOLA.